Oct. 21, 1941.    W. F. CALDWELL    2,260,111
APPARATUS FOR CONDUCTING CHEMICAL REACTIONS
AT CONSTANT TEMPERATURE
Filed Feb. 8, 1939
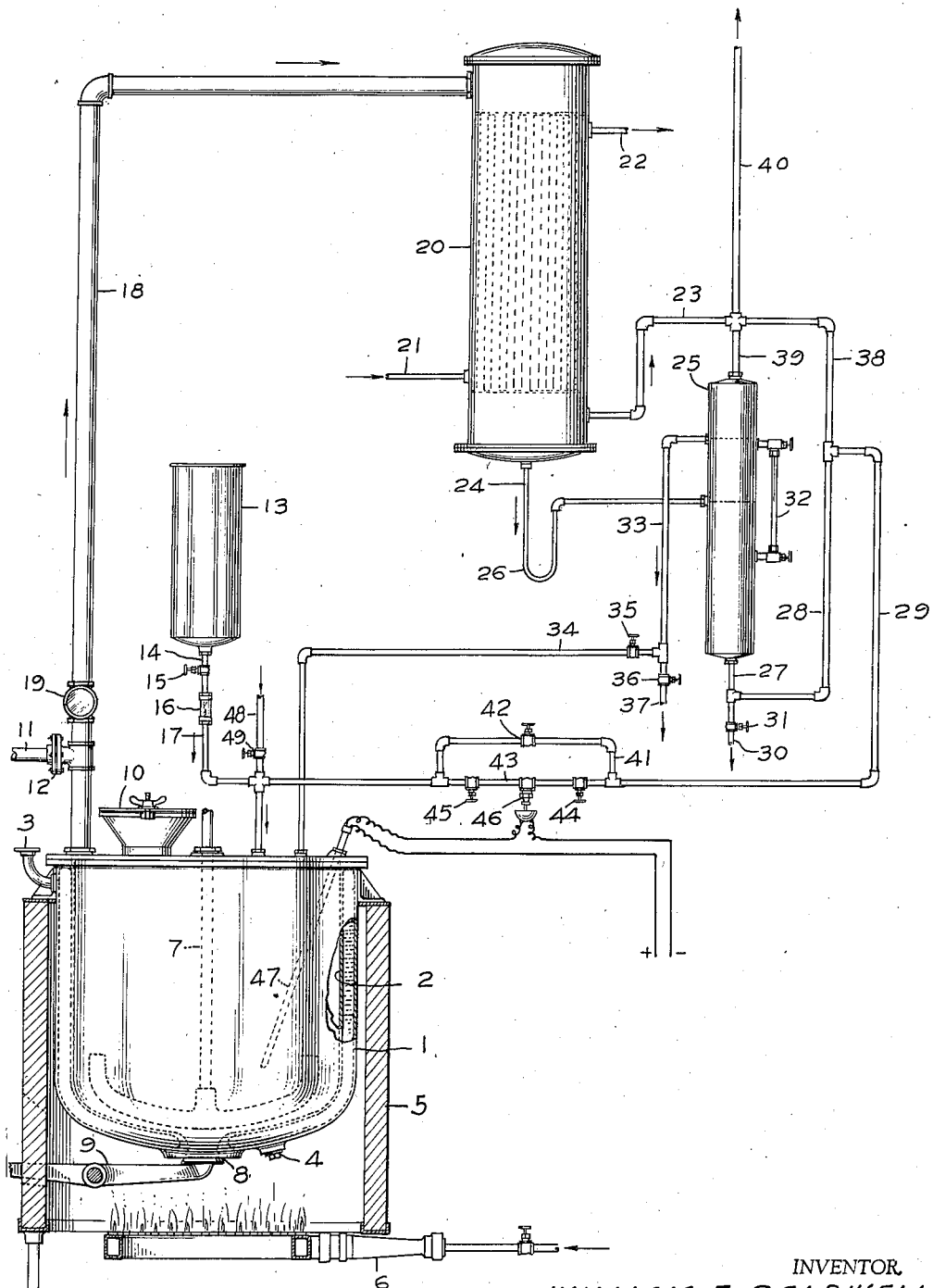
INVENTOR.
WILLIAM F. CALDWELL,
BY Ellis S. Middleton
ATTORNEY.

Patented Oct. 21, 1941

2,260,111

UNITED STATES PATENT OFFICE 2,260,111

APPARATUS FOR CONDUCTING CHEMICAL REACTIONS AT CONSTANT TEMPERATURE

William F. Caldwell, Old Greenwich, Conn., assignor to American Cyanamid Company, New York, N. Y., a corporation of Maine Application February 8, 1939, Serial No. 255,178

1 Claim. (Cl. 23—263)

This invention relates to an apparatus for conducting operations wherein it is desired to heat the materials being treated, and wherein it is desirable to maintain the temperature of the treatment substantially constant at a predetermined point.

An object of the invention is to provide an apparatus for treating materials wherein the temperature of the treatment is automatically maintained substantially constant at any predetermined point.

Another object of the invention is to provide an apparatus for reacting substances at constant temperature, removing volatile fractions from the substances being reacted, and separating immiscible components of said volatile fractions. Still another object of the invention is to provide an apparatus for reacting substances, distilling off volatile fractions from the substances being reacted, condensing said volatile fractions, separating immiscible components of said volatile fractions, returning at least one component of the volatile fractions to the reacting substances, and controlling the rate of return of said component automatically in order to maintain the temperature of the reacting substances substantially constant.

It is also an object of this invention to provide an apparatus for reacting substances wherein the reaction temperature is maintained substantially constant by automatically controlling the flow of a material into the reacting substances at such a rate that the boiling point of the reacting substances remains substantially constant.

In accordance with the invention, a suitable reaction chamber is provided with a suitable heating means, a condenser attached to the reaction chamber, a separator attached to the condenser, draw-offs from the separator which also have connections leading to the reaction chamber, suitable control means in said connections, and means for charging and discharging the reaction chamber. The apparatus also comprises a means for automatically controlling the flow of a material into the reaction chamber in order to prevent the temperature in the reaction chamber from rising above a certain predetermined point.

The apparatus is suitable for carrying out a wide variety of operations wherein it is desirable to maintain a heated mass at substantially constant temperature, or to separate one or more of the reaction products from other ingredients of the reaction mixture, or one from another. Among these operations are: The conversion of a ricinoleate, such as castor oil, into other organic compounds (such as sebacic acid, salts of sebacic acid, capryl alcohol, omega-hydroxydecanoic acid, salts of omega-hydroxydecanoic acid, and methyl-hexyl ketone), resin condensations, azeotropic esterification reactions, sulfonation reactions (particularly those in which an alkylation operation is also being conducted), dehydrations, etc.

The accompanying drawing shows somewhat diagrammatically the apparatus, partly in section and partly in elevation.

A suitable reaction chamber has an outer shell 1 and preferably is provided with an inner shell 2, leaving a space between shells 1 and 2 into which a heat transfer medium such as oil, "Dowtherm" (a mixture of diphenyl and diphenyl oxide), may be placed, or through which such a heat transfer medium may be circulated from a source of supply, heated independently. Shell 1 is provided with an inlet 3 and an outlet 4 which connect with the space between shells 1 and 2. The reaction chamber is preferably surrounded by an insulating material 5, and it is heated by a burner 6. The reaction chamber is fitted with a suitable stirrer 7 and contains a discharge outlet 8 with a drop-out valve 9. The top of the reaction chamber contains a charging port 10. A supply tank 13 has an outlet conduit 14 which is provided with a suitable valve 15 and connects with conduit 17 through a sight glass 16 and conduit 17 connects with the reaction chamber. Any number of supply tanks and connecting conduits and valves may be connected to the reaction chamber in the same way as supply tank 13.

The top of the reaction chamber also has an outlet conduit 18 attached thereto, and this conduit may contain a sight glass 19. Optionally, a conduit 11 connects with conduit 18 and is provided with a flange containing a frangible disk 12 which will break if the pressure in the reaction chamber goes up beyond a certain predetermined limit. The conduit 18 is connected to a condenser 20 and cooling water or other cooling medium may be circulated through the condenser by means of inlet 21 and outlet 22. The condenser 20 also has vent 23 and a condensate outlet 24 which feeds into a separator 25 through a gooseneck 26. The separator 25 contains an outlet 27 at the bottom which connects with a standpipe formed by conduits 28 and 29. The outlet 27 from the separator 25 also contains a suitable draw-off line 30 provided with a valve 31. The separator may be provided with a sight glass 32 and has a draw-off pipe 33 near the top, at a point somewhat higher than the top of the standpipe.

The draw-off pipe 33 connects with conduit 34, which connects with the reaction chamber and is provided with a valve 35. Conduit 33 is provided with a valve 36 located at a point beyond the connection of conduit 34. Conduit 33 connects with conduit 37 and the latter connects with a suitable storage, or alternatively, further processing apparatus (not shown). A pressure equalizing conduit 39 is connected to the top of the separator 25 and it connects with another equalizing conduit 38, which in turn connects with the top of the standpipe formed by conduits 28 and 29. Pressure equalizing conduits 38 and 39 connect with vent 23 and outlet vent 40.

The conduit 29 connects with a by-pass conduit 41 which contains a valve 42 (preferably a needle valve). Conduit 29 also connects with conduit 43 containing valves 44 and 45 (the latter being preferably a needle valve), and an automatic valve 46 operated electrically or by fluid pressure located between valves 44 and 45. Conduits 41 and 43 connect with the reaction vessel. The automatic valve 46 is operated by any suitable well-known means, and its operation is controlled by thermostatic element 47. Valve 46 opens whenever the temperature in the reaction chamber rises above a certain predetermined point, and closes when the temperature returns to this point. In this way the temperature in the reaction chamber remains substantially constant.

Water, or other fluid may be supplied to the reaction chamber directly through one or more conduits 48 which are provided with valves 49.

Conduits 34 and 48 may also be provided with by-pass conduits and automatically actuated valve systems such as described above, and which comprise elements 41, 42, 43, 44, 45 and 46. The automatically actuated valves may be controlled similarly by the thermostatic element 47.

As stated before, this apparatus may be used for any purpose wherein it is desirable to maintain a heated reaction mass at a substantially constant temperature, and/or wherein it is desirable to separate one or more of the reaction products from the other ingredients of the reaction mixture, or one from another. Merely as an illustration of one use to which it may be applied, its use in converting castor oil into other organic compounds will be described.

A mixture of caustic and water is charged into the reaction chamber and heated to a suitable reaction temperature (usually between about 180° C. and 275° C.) The agitator 7 is placed in operation, the valve 42 is opened slightly, the thermostatic control and valve 46 are placed in operation. Castor oil is supplied from tank 13 and is fed slowly into the reaction chamber at such a rate that no foaming is visible in the sight glass 19. The volatile reaction products distill off along with some water and pass up through conduit 18, and are condensed in the condenser 20. The condensate from the condenser 20 flows through conduit 24 into the separator 25, where it separates into an essentially aqueous fraction and an essentially non-aqueous fraction. The essentially aqueous fraction of the condensate is usually returned to the reaction chamber through the conduit system formed by elements 27, 28, 29, 41 and 43. Optionally it may be drawn off through conduits 27 and 30. A continuous stream of the essentially aqueous fraction of the condensate is permitted to flow back into the reaction chamber through by-pass conduit 41, and its rate is adjusted by means of valve 42. Whenever the temperature in the reaction chamber rises above the desired reaction temperature for which the thermostatic control has been set, automatic valve 46 opens, thus permitting part of the essentially aqueous fraction of the condensate to flow through conduit 43 into the reaction chamber. In this way, the boiling point of the reaction mixture is maintained substantially constant. The essentially non-aqueous fraction of the condensate is usually drawn off through conduit 33 and its flow into conduit 37 is controlled by valve 36. The non-aqueous fraction of the condensate flows through conduit 37 to a suitable storage, or to other processing apparatus (not shown). Alternatively, at least part of the essentially non-aqueous fraction of the condensate may be permitted to flow back to the reaction chamber through conduit 34 by opening valve 35. The hydrogen which may be formed during the reaction escapes through the vent 23. The residue in the reaction chamber may be removed through the outlet 8 by opening the drop out valve 9, or optionally, from the charging port 10. Any surges of pressure in the apparatus will be equalized throughout the system comprising the condenser and the separator, by means of the pressure equalizing conduits 38 and 39 which connect with vent 23.

If desirable in certain processes, the fraction of the condensate having the lower specific gravity may be returned to the reaction chamber through conduits 33 and 34, and, in order to maintain the temperature in the reaction chamber substantially constant, the flow may be controlled by means of a suitable by-pass and automatically actuated valve system such as that described which comprises elements 41 to 46 inclusive. Similarly, water or other fluid may be introduced into the reaction chamber by means of conduit 48 and valve 49 and, similarly, constant temperature in the reaction chamber may be maintained by controlling the flow of such fluid by means of a suitable by-pass and automatically actuated valve system such as that described above, comprising elements 41 to 46 inclusive. The by-pass and automatically controlled valve systems in either or both of conduits 34 and 48 may be in addition to or alternative to the by-pass and automatically controlled valve system specifically shown herein connected to the conduit 29.

Obviously, many modifications of the apparatus as described above are possible without departing from the spirit and scope of the invention as defined in the appended claim.

An apparatus adapted for carrying out reactions at a substantially constant temperature comprising a reaction chamber, means for heating said reaction chamber, means through which materials may be introduced into and withdrawn from the reaction chamber, means connected to the reaction chamber for removing and condensing volatile matter, means for separating the resulting condensate into a plurality of immiscible fractions according to specific gravity, means for conveying condensed volatile matter from the condenser to the separator, a conduit for returning at least one fraction to the reaction chamber, which conduit is connected with the separator and said chamber, a needle valve in said conduit for manually regulating the continuous flow of a portion of said fraction, and a by-pass conduit around said valve containing a valve which is automatically controlled by a thermo-responsive element in the reaction chamber so that an additional portion of said fraction flows into the reaction chamber when the temperature therein rises above a predetermined point, thereby maintaining the temperature in the reaction chamber substantially constant.

WILLIAM F. CALDWELL.